United States Patent
Lehr et al.

(10) Patent No.: US 11,187,324 B2
(45) Date of Patent: Nov. 30, 2021

(54) GASKETS WITH A NON-COMPRESSIBLE CORE AND ONE OR MORE COMPRESSIBLE LAYERS

(71) Applicant: Lydall Performance Materials (US), Inc., Lancaster, PA (US)

(72) Inventors: Brian C. Lehr, Lancaster, PA (US); Krishna Venkataswamy, Christal Lake, IL (US); Jeffery L. Barrall, Lititz, PA (US)

(73) Assignee: Lydall Performance Materials (US), Inc., Lancaster, PA (US)

( * ) Notice: Subject to any disclaimer, the term of this patent is extended or adjusted under 35 U.S.C. 154(b) by 158 days.

(21) Appl. No.: 16/433,795

(22) Filed: Jun. 6, 2019

(65) Prior Publication Data

US 2019/0376601 A1  Dec. 12, 2019

Related U.S. Application Data

(60) Provisional application No. 62/682,405, filed on Jun. 8, 2018, provisional application No. 62/682,414, filed on Jun. 8, 2018, provisional application No. 62/826,063, filed on Mar. 29, 2019, provisional application No. 62/857,951, filed on Jun. 6, 2019.

(51) Int. Cl.
*F16J 15/12* (2006.01)
*F16J 15/08* (2006.01)

(52) U.S. Cl.
CPC .......... *F16J 15/122* (2013.01); *F16J 15/127* (2013.01); *F16J 2015/085* (2013.01); *F16J 2015/0856* (2013.01); *F16J 2015/0868* (2013.01)

(58) Field of Classification Search
CPC .. F16J 15/122; F16J 15/127; F16J 2015/0856; F16J 2015/0868; F16J 2015/085
See application file for complete search history.

(56) References Cited

U.S. PATENT DOCUMENTS

| | | | | |
|---|---|---|---|---|
| 2,992,151 A * | 7/1961 | Niessen | ................ | F16J 15/122 428/133 |
| 3,608,914 A * | 9/1971 | Harby | ................... | F16J 15/122 277/654 |
| 3,914,490 A * | 10/1975 | Fusiek | ................... | F16J 15/122 428/133 |
| 4,234,638 A * | 11/1980 | Yamazoe | ............. | C04B 14/022 264/112 |
| 4,723,783 A * | 2/1988 | Belter | ................... | F16J 15/122 277/592 |
| 4,776,602 A * | 10/1988 | Gallo | ..................... | F16J 15/122 277/592 |
| 4,822,062 A * | 4/1989 | Gallo | ..................... | F16J 15/122 277/592 |
| 4,839,221 A * | 6/1989 | Asaumi | ................. | F16J 15/122 442/376 |

(Continued)

*Primary Examiner* — Nicholas L Foster
(74) *Attorney, Agent, or Firm* — Crowell & Moring LLP

(57) ABSTRACT

According to some embodiments, a multi-layer gasket with a non-compressible core, formed of any material that is relatively rigid and incompressible and can serve as a carrier for a gasket, and compressible layers, formed of any flowable or compressible sealing material with appropriate rheology for a particular sealing application, in the form of edge or surface coatings, is presented.

11 Claims, 12 Drawing Sheets

(56) References Cited

U.S. PATENT DOCUMENTS

| | | | | |
|---|---|---|---|---|
| 4,990,544 | A * | 2/1991 | Asaumi | F16J 15/122 521/145 |
| 5,172,920 | A * | 12/1992 | Schlenk | F16J 15/122 277/592 |
| 5,681,048 | A * | 10/1997 | Tronel | F16J 15/122 277/592 |
| 7,862,049 | B2 * | 1/2011 | Olson | F16J 15/122 277/650 |
| 7,905,498 | B2 * | 3/2011 | Dempsey | F16J 15/125 277/649 |
| 2005/0280214 | A1 * | 12/2005 | Richards | F16J 15/122 277/608 |
| 2007/0228668 | A1 * | 10/2007 | Dempsey | F16J 15/125 277/627 |
| 2007/0241517 | A1 * | 10/2007 | Olson | F16J 15/122 277/628 |
| 2008/0280040 | A1 * | 11/2008 | Barrall | F16J 15/122 427/256 |

* cited by examiner

GASKETS WITH A NON-COMPRESSIBLE CORE AND ONE OR MORE COMPRESSIBLE LAYERS

CROSS-REFERENCE TO RELATED APPLICATIONS

This application claims the benefit of priority to U.S. Patent Application No. 62/682,405, filed Jun. 8, 2018, U.S. Patent Application No. 62/682,414, filed Jun. 8, 2018, U.S. Patent Application No. 62/826,063, filed Mar. 29, 2019, and U.S. Patent Application No. 62/857,951, filed Jun. 6, 2019, the entire contents of each of which are incorporated herein by reference.

BACKGROUND OF THE DISCLOSURE

Gaskets with rigid cores that are rubber-coated have long been used in various sealing applications. These gaskets are often made with steel, stainless steel, or aluminum core or carrier for support and rigidity. Prior to WWII, natural rubber was used as a coating on metal gaskets to enhance sealability. During the War, nitrile rubber was developed as a viable oil-resistant alternative to natural rubber. Nitrile rubber excelled because it exhibited a superior level of resistance to synthetic and natural greases, oils, and other caustic materials, while retaining the compressibility and sealability characteristics of natural rubber.

Rubber-coated gaskets of the present state of the art typically include a core that is coated with nitrile rubber. A gasket, in many applications, must be capable of sealing two separable mating surfaces of flanges forming a mechanical seal between the surfaces, and be impervious and resistant to the sealed media. Gaskets also must be able to withstand the application of elevated temperature and pressure in many applications.

Rubber-coated gaskets are typically used for pumps and semi-hermetic compressors, oil pans, valve covers, and other applications where oil and grease are present, pressures that must be sealed are relatively low, and/or sealing surfaces are not uniform. Rubber-coated gaskets may also be used in high-pressure applications, such as head gaskets in automotive applications.

While rubber-coated and rubber-on metal gaskets are advantageous to use under certain conditions, alternatives to these materials have advantages in certain applications. Thermoplastic elastomer (TPE) is an alternative to rubber that provides advantages such as easy processing and application using thermoplastic technologies such as spraying, injection molding, 2D molding, extrusion, direct application, sintering, baking, overlaying, and laminating. Furthermore, TPEs have proven themselves extremely reliable when in contact with otherwise corrosive materials such as natural and synthetic oils, greases, and lubricants, making them excellent for use in gaskets. Additionally, cracking does not occur with TPE. When cracks form, due to extreme application conditions including fluctuations in temperature and pressure, leak paths can form between the sealed fluid central opening of the gasket and the outer environment, reducing the sealing effectiveness of the gasket. Cracking does not occur with TPE, which minimizes the risk of a compromised seal due to the formation of leak paths.

As an alternative to metal, other non-compressible materials can be used to form the gasket core. Composite material, for example, has a low coefficient of thermal expansion and contraction, which helps to preserve the quality of the gasket seal over time. Composite material is also resistant to oxidation and corrosion when exposed to hostile or corrosive conditions for long periods.

In use, a compressible coated gasket is clamped between two separable mating surfaces of flanges forming a mechanical seal between the surfaces. The flanges may be secured together with bolts tightened to a specified torque to form a joint. When the bolts of a joint are torqued or tightened, the force imparted to one flange by the other becomes significantly greater around the bolt holes than in the mid-spans of the flanges between the bolt holes. Further, the flanges deform or curve slightly in response to the tightening of the bolts. The distance between the flange mating surfaces in the mid-spans can, as a consequence, be greater than the distance between the mating surfaces in the vicinities of the bolt holes. As a result of the varying distances between different location on mating surfaces, gaskets of the prior art have failed to create a pressure-resistant seal to enclose the sealed media.

Prior art compressible gaskets can take several forms. FIGS. 1A-1C illustrate examples of three compressible gaskets of the prior art. FIG. 1A shows an edge-coated gasket 1 of the prior art in which a fiber gasket 2, which is slightly compressible, is provided with a polymer edge coating 3. The fiber gasket 2 conforms somewhat to varying distances between flange mating surfaces, and the polymer edge coating 3 forms an adhesive seal around a fluid opening. FIG. 1B shows another prior art gasket 1 wherein a sheet of gasket material 4 is embossed as shown to form a surface with depressions and projections defined by a ridge 5. The ridge 5 functions to concentrate sealing force and to conform somewhat to varying distances between mating surfaces in different regions of a flange to increase the integrity of the seal. FIG. 1C shows another gasket 1 of the prior art used for sealing and compensating for varying distances between mating surfaces. Here, a gasket 1 has a core 8, which may be a non-compressible core made of metal, for example, having a rubberized coating 6 on the top and bottom surfaces of the non-compressible core 8. The coatings 6 include compressible surface projections 7, the purpose of which is to concentrate sealing force and compensate for flange warp when the gasket 1 is tightened between the mating surfaces of flanges.

FIG. 2A illustrates a prior art embossed gasket 1 such as that shown in FIG. 1B including the sheet of gasket material 4 and the embossed ridge 5. FIG. 2B is a photo of a Fujifilm pressure map showing the pressure distribution of an embossed gasket 1 such as that illustrated in FIG. 2A. The pressure map shows less than reliable seals formed in the regions of the gasket 1 outside the embossments. The dark red lines on the pressure map show that the ridge 5 formed from the embossment creates a thin contact area forming a concentrated pressurized reliable seal along the embossment perimeter. However, the ridge 5 formed by the embossment prevents contact and pressurized sealing between the flange surface and the non-embossed portions of the gasket material 4. This sealing configuration is prone to failure if the concentrated sealing area is compromised, for example if the embossment is improperly or incompletely formed or the ridge 5 otherwise fails to establish a sealing configuration on the gasket sheet 4.

While the prior art illustrates solutions to certain sealing scenarios, the sealing gaskets of the prior art require dedicated presses and molds for their fabrication, are expensive to manufacture, difficult to prototype quickly, and are not ideally suited to provide an evenly distributed surface sealing effect. In view of the disadvantages associated with currently available sealing gaskets, there is a need for a new gasket configuration that is relatively inexpensive to manufacture, easy to prototype and modify quickly during research, self-conforming to varying distances between mating surfaces without embossments or ridges, and that is customizable to a degree not heretofore possible with prior art gaskets. It is to the provision of such a new gasket configuration that the present disclosure is primarily directed.

Accordingly, there is a need for a coated gasket that exhibits superior sealing characteristics when compared to natural rubber or nitrile rubber-coated gaskets that uses a coating material that is fabrication-friendly, easily stored and applied, and less expensive than natural and synthetic rubber products.

There is also a need for a gasket having an incompressible, rigid, non-porous substrate with a coating or coatings or surfaces or edges that are preferable to rubber-based coatings of the past. A need also exists for a gasket having an incompressible and non-porous core that is not metal but that performs like a metal without the undesirable properties of metal. There is also a need for a gasket with a non-metal substrate having surface and/or edge coatings of rubber or a polymeric material. There is a need for a compressible gasket configuration that is relatively inexpensive to manufacture, easy to prototype and change during research, self-conforming to varying distances between mating surfaces without embossments or ridges, and that is customizable to a degree not heretofore possible with prior art gaskets.

BRIEF DESCRIPTION OF THE EXEMPLARY EMBODIMENTS

According to an aspect, the exemplary embodiments include a gasket for forming a seal between a first mating surface and a second mating surface, including a non-compressible substrate with a first surface, a second surface, and a central opening having a surrounding edge, a first compressible layer applied to at least a portion of the first surface, a second compressible layer applied to at least a portion of the second surface, and an edge coating applied to the surrounding edge of the central opening.

In another aspect, the exemplary embodiments include a gasket for forming a seal between a first mating surface and a second mating surface, including a non-compressible substrate with a first surface, a second surface, and a central opening, a first compressible layer configured to cover the entire first surface and to contact the first mating surface in a surface-to-surface abutting relationship, and a second compressible layer configured to cover the entire second surface and to contact the second mating surface in a surface-to-surface abutting relationship, wherein at least one of the first compressible layer and second compressible layer is conformed to fill at least one defect in at least one of the first mating surface and the second mating surface upon compression of the gasket.

In a further aspect, the exemplary embodiments include a method of sealing a first mating surface and a second mating surface, the method including providing a gasket 100 having a non-compressible substrate, a first compressible layer conformed to sealingly engage with the first mating surface, and a second compressible layer conformed to sealingly engage with the second mating surface, wherein the non-compressible substrate is configured between the first compressible layer and the second compressible layer, positioning the gasket between the first mating surface and the second mating surface, compressing the gasket, conforming at least one of the first compressible layer and the second compressible layer to distribute compression forces evenly across the surface area of the gasket, and uniformly sealing the first compressible layer and the first mating surface and the second compressible layer and the second mating surface.

BRIEF DESCRIPTION OF THE DRAWINGS

A more particular description will be rendered by reference to exemplary embodiments that are illustrated in the accompanying drawings. Understanding that these drawings depict exemplary embodiments and do not limit the scope of this disclosure, the exemplary embodiments will be described and explained with additional specificity and detail through the use of the accompanying drawings in which:

FIGS. 18A-18D are drawings depicting Fujifilm pressure maps of gaskets, wherein FIG. 18A is a pressure map of a gasket according to the prior art at a first torque, FIG. 18B is a pressure map of a gasket according to an embodiment at a first torque, FIG. 18C is a pressure map of a gasket according to the prior art at a second torque, and FIG. 18D is a pressure map of a gasket according to an embodiment at a second torque.

Figure 1A:
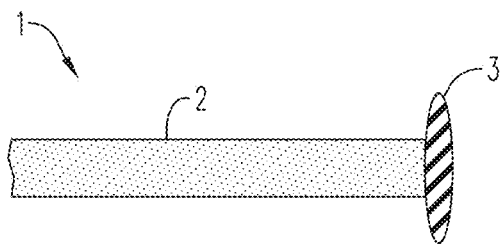
FIGS. 1A-1C are cross-sectional side views of examples of gaskets according to the prior art.
Figure 1B:
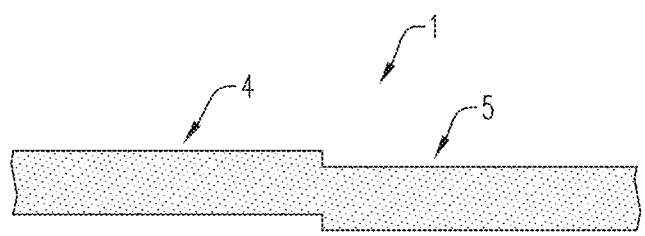
Figure 1C:
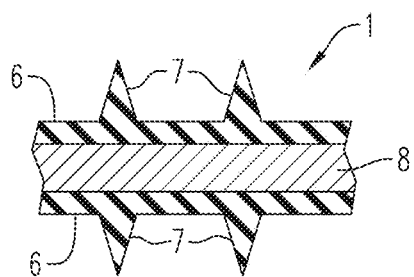
Figure 2A:
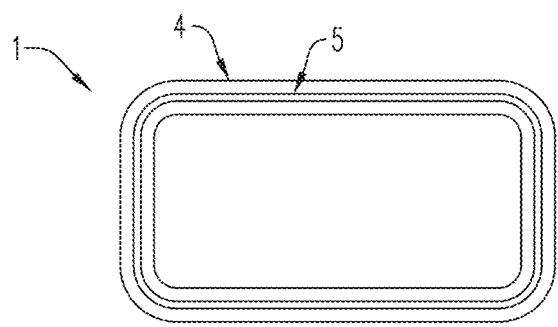
FIG. 2A is a top view of the prior art gasket shown in FIG. 1B.
Figure 2B:
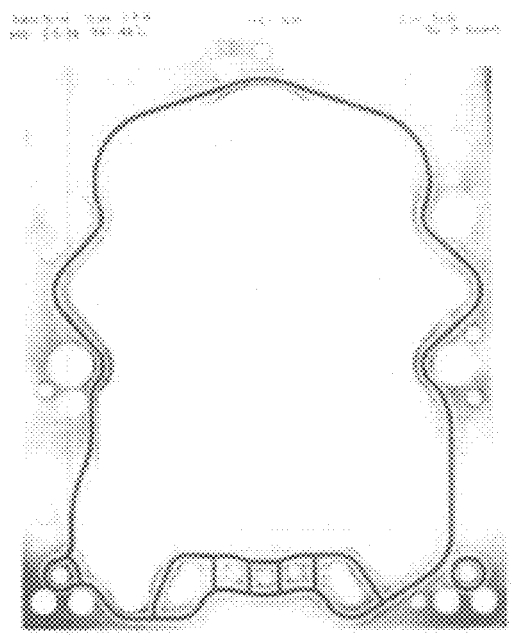
FIG. 2B is a photograph of a Fujifilm pressure map of a prior art gasket.

Various features, aspects, and advantages of the exemplary embodiments will become more apparent from the following detailed description, along with the accompanying drawings in which like numerals represent like components throughout the drawings and detailed description. The various described features are not necessarily drawn to scale in the drawings but are drawn to emphasize specific features relevant to some embodiments.

The headings used herein are for organizational purposes only and are not meant to limit the scope of the disclosure or the claims.

DETAILED DESCRIPTION

Reference will now be made in detail to various embodiments. Each example is provided by way of explanation and is not meant as a limitation and does not constitute a definition of all possible embodiments.

Embodiments described herein relate generally to devices and methods for gaskets having an incompressible core coated with a compressible coating/layer. For purposes of this disclosure, the phrases "devices," "systems," and "methods" may be used either individually or in any combination referring without limitation to disclosed components, grouping, arrangements, steps, functions, or processes.

For purposes of illustrating features of the embodiments, exemplary embodiments will now be introduced and referenced throughout the disclosure. These examples are illustrative and not limiting and are provided for illustrating the exemplary features of a gasket with a non-compressible core and compressible coating/layer as described throughout this disclosure.

Figure 3:
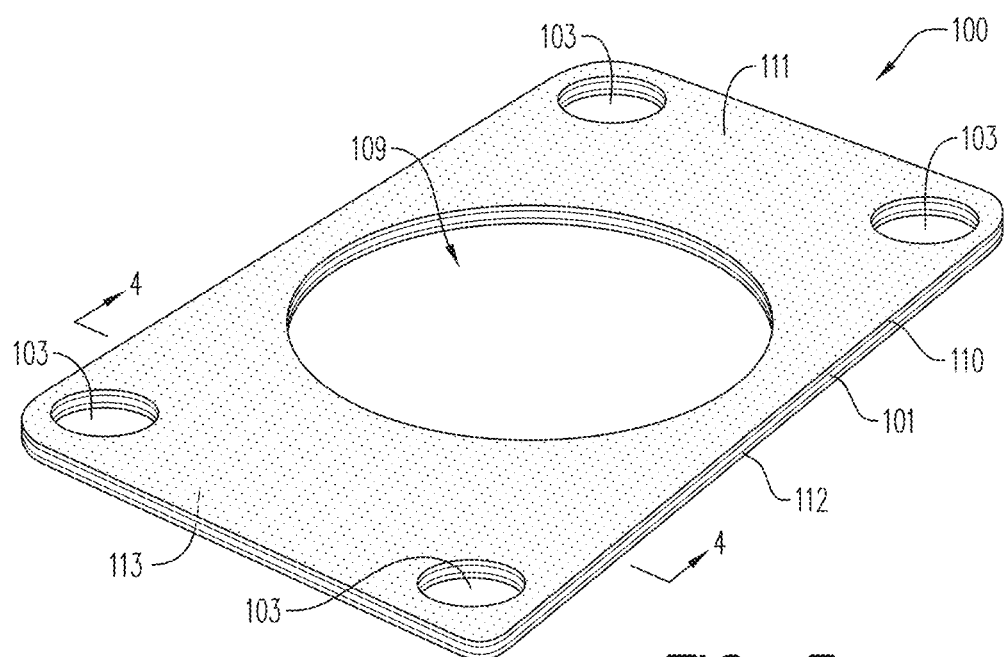
FIG. 3 is a perspective view of a gasket in accordance with an embodiment.
Figure 4:
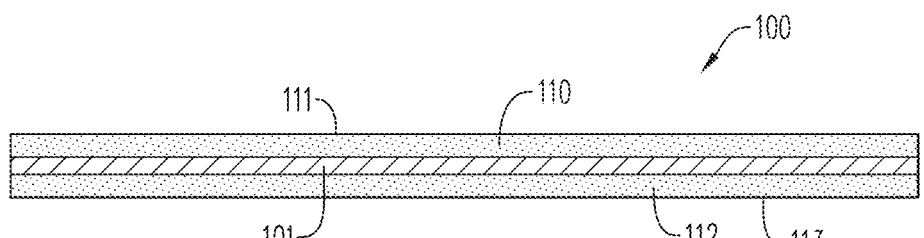
FIG. 4 is a cross-sectional side view of the gasket taken along lines 4-4 of FIG. 3.

Turning now to FIGS. 3 and 4, an embodiment of a gasket 100 is illustrated. The gasket 100 is formed with a non-compressible core or carrier 101 that may be made of a metal such as steel, stainless steel, aluminum, or other appropriate materials such as a thin carbon fiber composite with properties similar to steel. The non-compressible core 101 may be formed of any material that is relatively rigid and incompressible and can serve as a carrier or core for a gasket. The non-compressible core 101 is stamped or otherwise formed to define appropriate apertures (e.g. fluid passageway) 109 and bolt holes 103 that extend through the non-compressible core 101 and conform to features of the flanges to be sealed.

According to an embodiment, a first compressible layer 110 is applied to one side of the non-compressible core 101 and/or a second compressible layer 112 is applied to the other side of the non-compressible core 101. The gasket 100 has a surface 111 defined by the exposed surface of the first compressible layer 110, and a surface 113 defined by the exposed surface of the second compressible layer 112. In use, the top surface 111 and bottom surface 113 contact exposed surfaces of two mating flanges to be sealed and the first compressible layer 110 and the second compressible layer 112 can compress significantly to fill defects in the mating surfaces, thereby forming a reliable seal.

The sealing material from which the first compressible layer 110 and second compressible layer 112 can be formed may be a polymeric material or any other material with appropriate rheology for a particular sealing application. In each case, the specific sealing material can be formulated or engineered to exhibit desired properties for a specific sealing task by varying additives such as oil and fillers and soft rubber materials that affect the performance of the sealing material. The sealing material may include, for example, thermoset elastomers or thermoplastic elastomers (TPE), including polysiloxane, acrylic, olefins, vulcanized propylene/ethylene-propylene-diene compounds, polyurethane, styrenic styrene-ethylene/butylene-styrene, copolyester compounds, or polyamide. TPE is a material that is impervious to cracking under the conditions to which gaskets are commonly exposed. When cracks form, a leak path is created, and the use of TPE prevents leak paths from the central fluid opening of the gasket 100.

Figure 5:
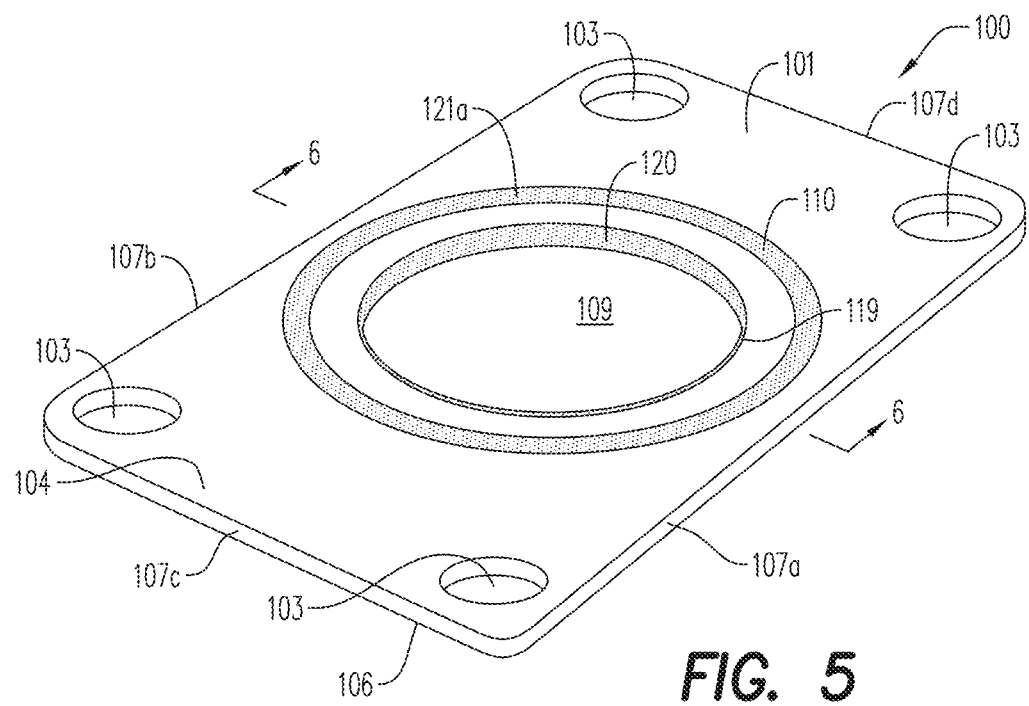
FIG. 5 is a perspective view of the gasket according to an embodiment.

FIGS. 5-9 illustrate gaskets 100 according to further embodiments. FIG. 5 is a perspective view of a rectangularly shaped gasket 100 according to an embodiment having a non-compressible core 101 formed of metal or metal alloy, such as steel, stainless steel, aluminum, copper, or other suitable material. While a rectangular shape has been used throughout to illustrate an exemplary gasket, it will be understood that gaskets made in accordance with the principles disclosed herein could take any shape. Bolt holes 103 are formed through the non-compressible core 101 near its corners to accommodate bolts that will clamp two mating surfaces together, compressing the gasket 100 between the surfaces to create a seal. A central opening 109 is formed through the non-compressible core 101 and is sized to encircle a fluid passageway extending through the mating surfaces. The central opening 109 is surrounded and defined by a surrounding edge 119 of the metal non-compressible core 101.

A first compressible layer 110 is applied to a first surface 104 of the non-compressible core 101. A second compressible layer 112 is applied to a second surface 106 of the non-compressible core 101. In this embodiment, the first compressible layer 110 and second compressible layer 112 include a first bead 121a and a second bead 121b, respectively. The bead is applied to the first surface 104 and second surface 106 to provide a seal in a specific area of the gasket 100 when the gasket 100 is compressed between the flanges (as shown, for instance, in FIG. 17). In the illustrated embodiment, the first bead 121a and second bead 121b are shown as a simple circle outboard of or encircling the central opening 109. It will be understood by the skilled artisan, and is depicted in more detail in FIGS. 9A-9D, that the first bead 121a and second bead 121b on a gasket 100 can be configured in a variety of complex shapes and even varying thicknesses as needed to provide the area-specific sealing capabilities needed. The first bead 121a and second bead 121b may be formed of any sealing material that the first compressible layer 110 and second compressible layer 112 may be formed from, such as those described in detail hereinabove.

An edge coating 120 may be adhered to and extend around the surrounding edge 119 that defines the central opening 109 of the non-compressible core 101. The edge coating 120 is applied to the surrounding edge 119 and extends, in this particular example, both above and below the plane of the non-compressible core 101. The edge coating 120, like the first bead 121a and second bead 121b, is made of a sealing material that can be applied to the surrounding edge 119 in a number of ways. Examples of application of the sealing material onto the surfaces 104, 106 of the non-compressible core 101, or the surrounding edge 119 of the non-compressible core, include overlaying, laminating, coating, spraying, melting, dipping, curing, heat-welding, chemical bonding, or molding. In use, the edge coating 120 is compressible between two mating surfaces around the edges of the surfaces that encircle a fluid passageway. In this way, the edge coating 120 forms a seal at the fluid/gasket interface to prevent fluid from leaking past the edge coating 120 and into the regions between the non-compressible core 101 and mating surfaces.

With regard to fluid sealing, the sealing material of any of the edge coating 120, first bead 121a, second bead 121b, or first compressible layer 110 and second compressible layer 112 can be formulated to be specific to a fluid to which the gasket 100 will be exposed in use. For example, thermoplastic elastomers can be formulated that are resistant to oils, heat, gasses, grease, or caustic chemicals depending upon the intended use of the gasket. Furthermore, thermoplastic elastomer edge coatings can be engineered with varying thicknesses and dimensions as needed to provide a customized seal between two mating surfaces at the specific location where fluid encounters the gasket.

Figure 6:
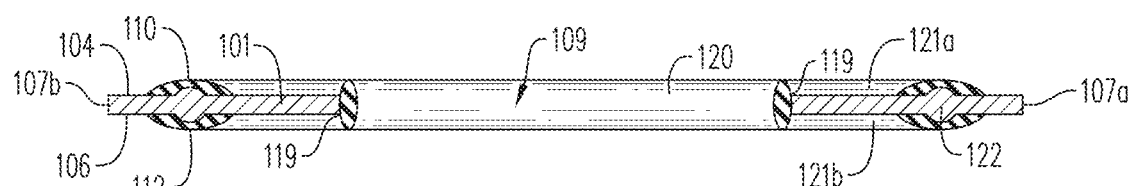
FIG. 6 is a cross-sectional side view of the gasket taken along lines 6-6 of FIG. 5.

FIG. 6 is a cross-sectional view of the gasket 100 of FIG. 5 illustrating the first compressible layer 110 as a first bead 121a, and the second compressible layer 112 as a second bead 121b, applied respectively to the first surface 104 and second surface 106 of the non-compressible core 101. Beads are often associated with embossed regions in the non-compressible core 101, which can help conform the gasket to slightly curved or rough mating surfaces when the gasket 100 is compressed between the surfaces. In FIG. 6, the first bead 121a and second bead 121b are respectively applied to the embossment 122 shown as a projection from both surfaces of the non-compressible core 101. The first bead 121a and second bead 121b are applied to cover the embossment 122 on both sides of the non-compressible core 101. FIG. 6 also illustrates the height to which the edge coating 120 projects from the planar first surface 104 and second surface 106 of the non-compressible core 101.

Figure 7:
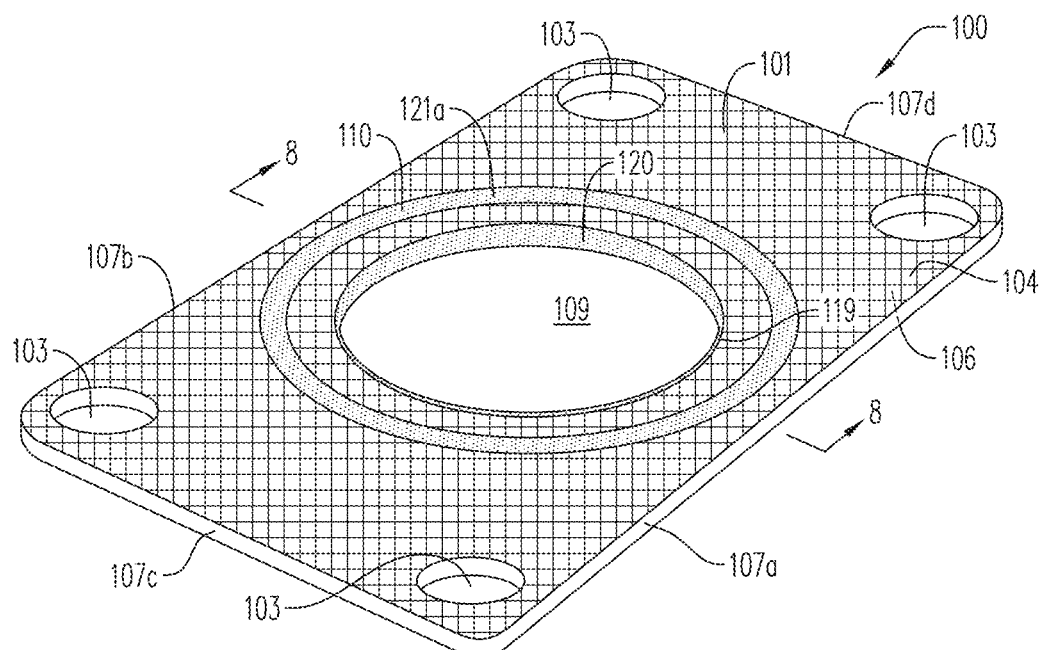
FIG. 7 is a perspective view of the gasket according to an embodiment.
Figure 8:
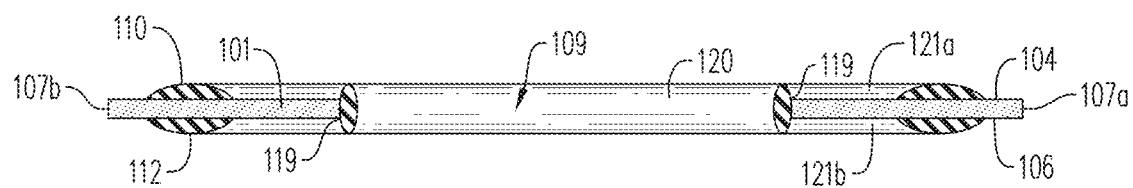
FIG. 8 is a cross-sectional side view of the gasket taken along lines 8-8 of FIG. 7.
Figure 9A:
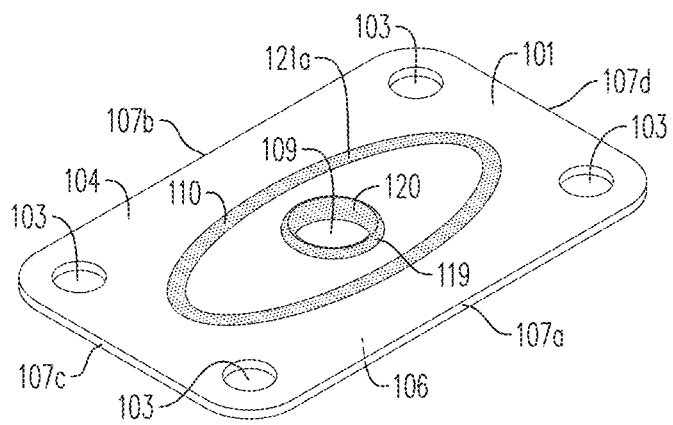
FIGS. 9A-9D are perspective views of several embodiments of the gasket according to FIGS. 5-8.
Figure 9B:
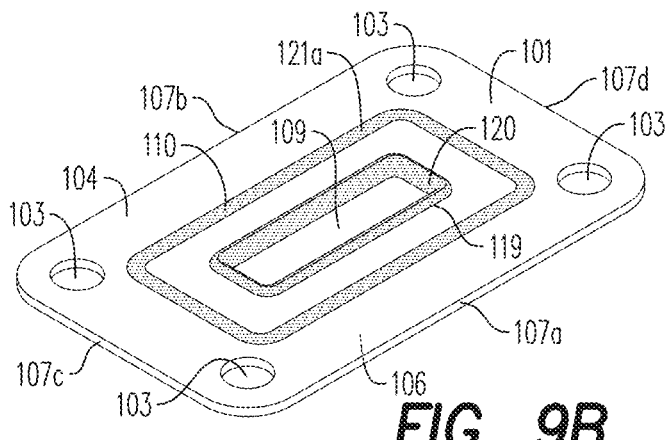
Figure 9C:
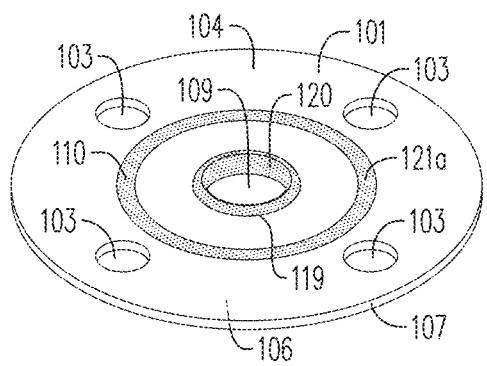
Figure 9D:
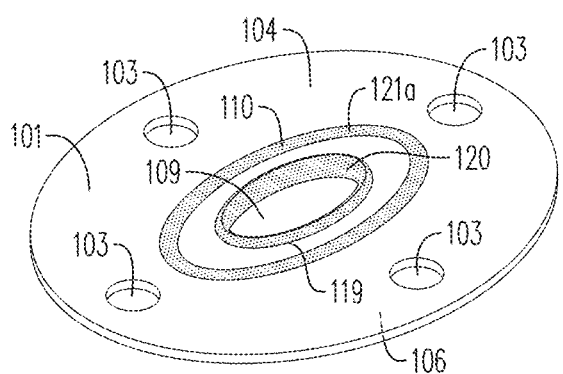

FIGS. 7 and 8 illustrate another embodiment of the gasket 100 wherein the non-compressible core 101 is provided as a thin composite substrate, such as carbon fiber or epoxy sheet. Such composites provide the shape and rigidity of metal gasket substrates, but also provide strength, lower thermal expansion and contraction coefficients, and better resistance to corrosion and oxidation. In FIGS. 7 and 8, the non-compressible core 101 formed of a thin composite material may have fibers or ribbons of carbon laid in the epoxy carrier in at least three different and crisscrossing directions. This arrangement provides strength and rigidity to the sheet that is similar to the strength of a metal substrate or core of the same thickness.

As with the embodiment of FIGS. 5 and 6, a first bead 121a and a second bead 121b are applied to the first surface 104 and second surface 106 of the non-compressible core 101 in FIGS. 7 and 8. The edge coating 120 is also depicted in FIGS. 7 and 8 as extending above the first surface 104 and below the second surface 106 of the non-compressible core 101 to provide a targeted and precise seal at the location where the gasket is exposed to a fluid being contained thereby.

The gasket 100 of FIGS. 5-8 are basic rectangular gaskets in accordance with an embodiment. However, the gasket 100, as well as its individual components, can take any shape needed to form a seal between two mating surfaces. For example, FIGS. 9A-9D show embodiments of the gasket 100 in different configurations with central opening 109, first bead 121a, second bead 121b, and non-compressible core 101 having different shapes. Additionally, for example, the first compressible layer 110 and the second compressible layer 112 may be spaced apart from the edge coating 120. Alternatively, the compressible layers 110, 112 may be adjacent to the edge coating 120. In some embodiments, the first compressible layer 110 and second compressible layer 112 form circles that are concentric to the edge coating 120 of the central opening 109 which is also circular. The first compressible layer 110, second compressible layer 112, and central opening 109 may be of any shape that is conducive for the particular sealing needs of the gasket 100. The gasket 100 may also take any shape needed for effective sealing of the mating surfaces between which it is placed.

Figure 10:
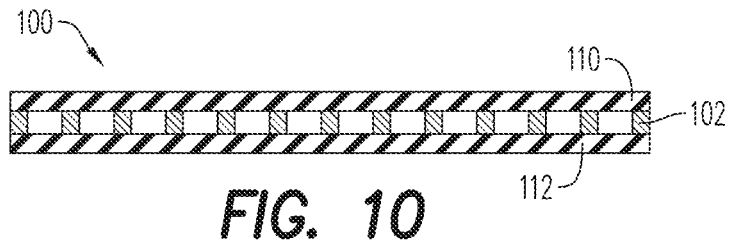
FIG. 10 is a cross-sectional side view of a gasket according to a further embodiment.

FIG. 10 illustrates a self-conforming gasket 100 according to an embodiment that has a central layer, or non-compressible core 102, and a first compressible layer 110 and/or a second compressible layer 112 positioned on opposing surfaces of the non-compressible core 102. According to an embodiment, the non-compressible core 102 may be coated on one side or on both sides with a first compressible layer 110 and a second compressible layer 112, formed of the sealing material described in detail hereinabove.

According to an embodiment, the non-compressible core 102 is composed of a metal, a thermoset plastic material, and/or a thermoset composite material. As such, the non-compressible core 102 may be formed of a mechanical member such as a perforated metal sheet. Such a sheet also may be formed of expanded metal that has subsequently been flattened with appropriate rollers, or by the punching and drawing of expanded sheet metal. The flattening of the non-compressible core 102 eliminates portions of the material that may project up or down from the plane of the mechanical member. Such protrusions tend to penetrate the upper and lower sealing material coatings when the gasket is placed under compression between mating surfaces, which can destroy the gasket seal. The non-compressible core 102 formed from the flattened mechanical member may then be coated with a first compressible layer 110 and a second compressible layer 112 according to an embodiment.

In further embodiments, the non-compressible core 102 is formed from a thermoset composite material that has been molded or otherwise shaped to be flat on its upper and lower surfaces with ribs that define the openings of the core. Alternatively, the middle layer may be 3D printed from a CAD design. In such an embodiment, the composite gridded core may be coated on one or two sides with the first compressible layer 110 and/or the second compressible layer 112, formed of a sealing material in the form of the thermoset elastomer or the thermoplastic elastomer (TPE), such as a UV silicone or acrylic TPE.

Figure 13A:
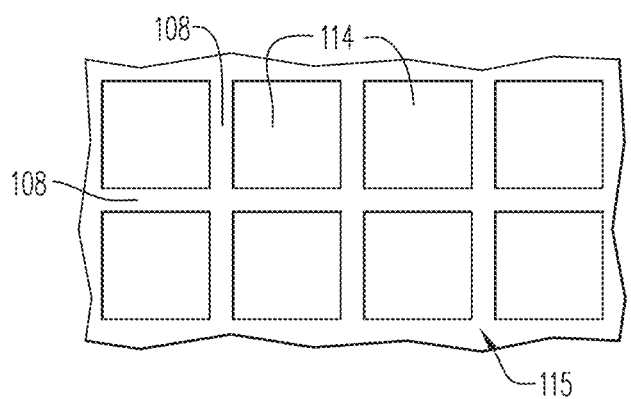
FIG. 13A is a top view of a section of a core layer of the gasket in accordance with an embodiment.
Figure 13B:
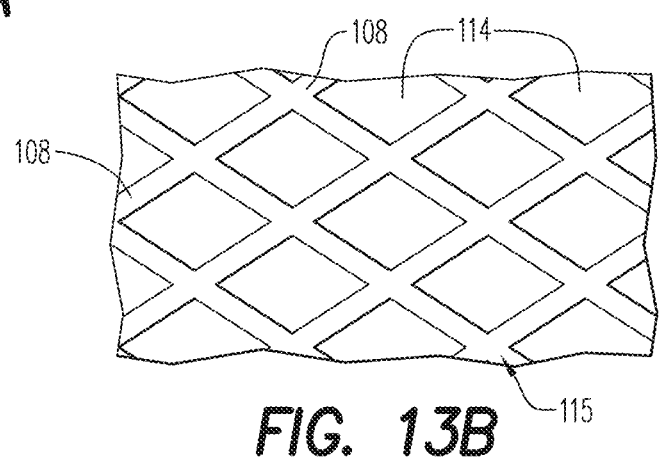
FIG. 13B is a top view of a section of a core layer of the gasket in accordance with an embodiment.

With reference to, for instance FIG. 13A and in its simplest form, the gridded non-compressible core 102 (the middle layer of FIG. 11) is formed from a plurality of crisscrossing, or interconnected, elements/ribs 108 that forms an array of openings 114. Depending on the conformation of the interconnected elements, the openings can be square (shown in the various figures), rectangular, diamond-shaped (see, for instance, FIGS. 11 and 13B), or hexagonal openings. However, as discussed below, the openings of the grid need not be shaped as one of those listed above, but can take on any shape and can be varied across the gasket to provide maximized sealing performance at all locations on the mating surfaces to be sealed. The configuration of the gridded core and its forming elements can thus be specifically engineered for a particular sealing application.

Figure 11:
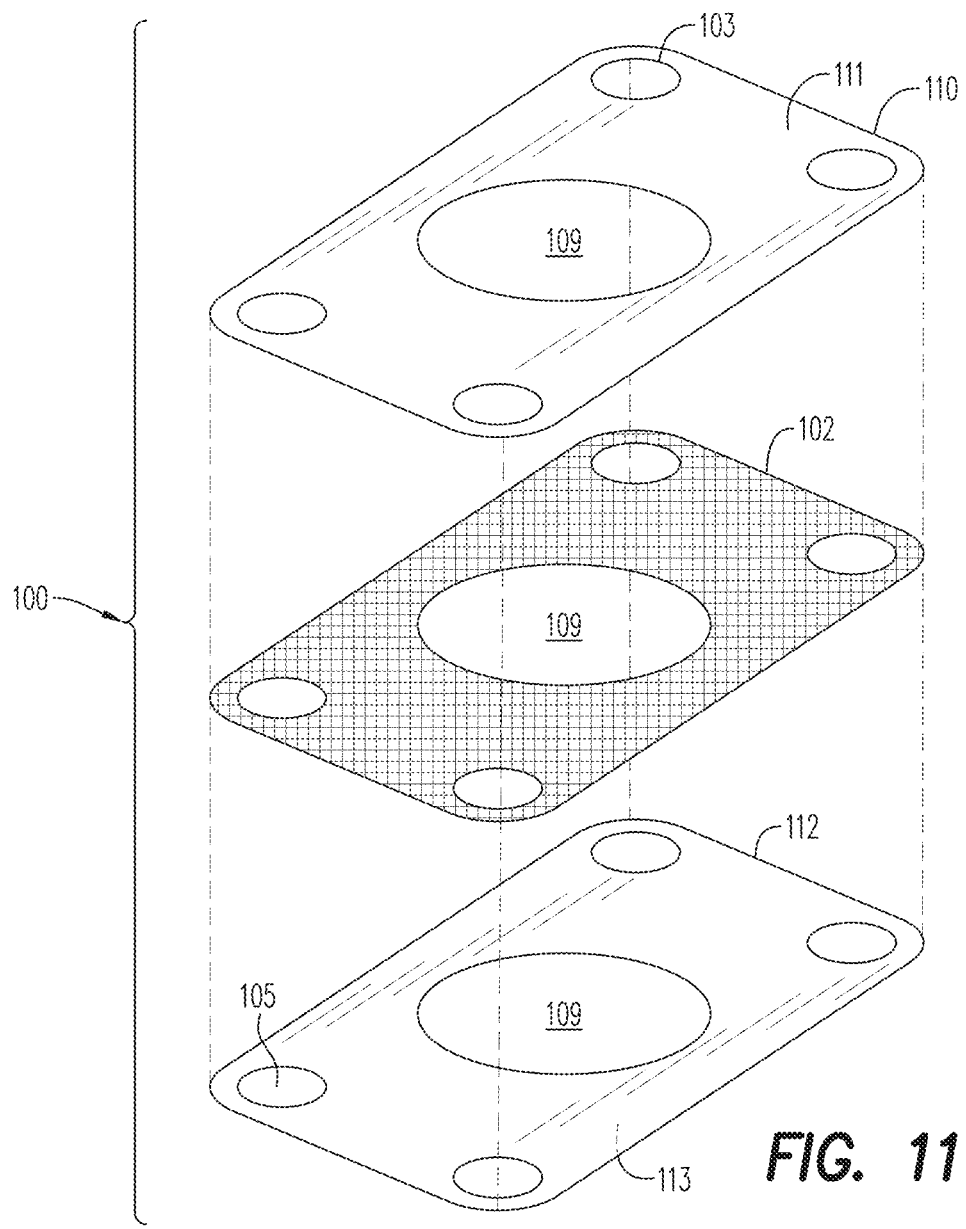
FIG. 11 is an exploded perspective view of a gasket in accordance with an embodiment.

Turning now to FIG. 11, the gasket 100 may be made of a flat metal, thermoset plastic, or thermoset composite non-compressible core 102 sandwiched between a first compressible layer 110 of sealing material and a second compressible layer 112 of sealing material. The first compressible layer 110 and second compressible layer 112 may be applied to the gridded non-compressible core 102 or attached by other means depending on the compositions and dimensions of the first compressible layer 110, the second compressible layer 112, and the non-compressible core 102. For example, the layers may be attached by overlaying, laminating, coating, spraying, melting, dipping, curing, heat-welding, chemical bonding, or molding. The first compressible layer 110 includes a surface 111 facing away from the non-compressible core 102 configured to engage and form a seal with a mating surface (e.g., a flange of a pipe to be joined to another pipe flange). The second compressible layer 112 includes a surface 113 facing away from the non-compressible core 102 configured to engage and form a seal with a respective mating surface. The gasket 100 has a first bolt hole 103, a second bolt hole 105, and a central fluid opening 109. (The gasket shown in FIG. 11 shows two additional bolt holes opposite the first and second bolt holes, but these have not been labeled.) The bolt holes and central fluid opening 109 are each defined by apertures extending through each of the first compressible layer 110, non-compressible core 102, and second compressible layer 112. In certain embodiments, the first bolt hole 103, second bolt hole 105, and central fluid opening 109 may extend through only at least one of a first compressible layer 110 and a second compressible layer 112 depending on the formation of the gasket 100 at the hole location. The non-compressible core 102 may be configured such that there are a plurality of ribs 108 extending in any direction away from the central fluid opening 109. The ribs 108 may be configured so that the spaces 114 are diamond-shaped, as a result of the method of manufacture used to form the non-compressible core 102. As shown in FIG. 11, the ribs extend tangentially from the central fluid opening 109 and form a diamond-shaped pattern. While this is a simplified gasket for illustrative purposes, gaskets of highly complex shapes with alternative bolt hole configurations are common and are within the scope contemplated herein.

Figure 12:
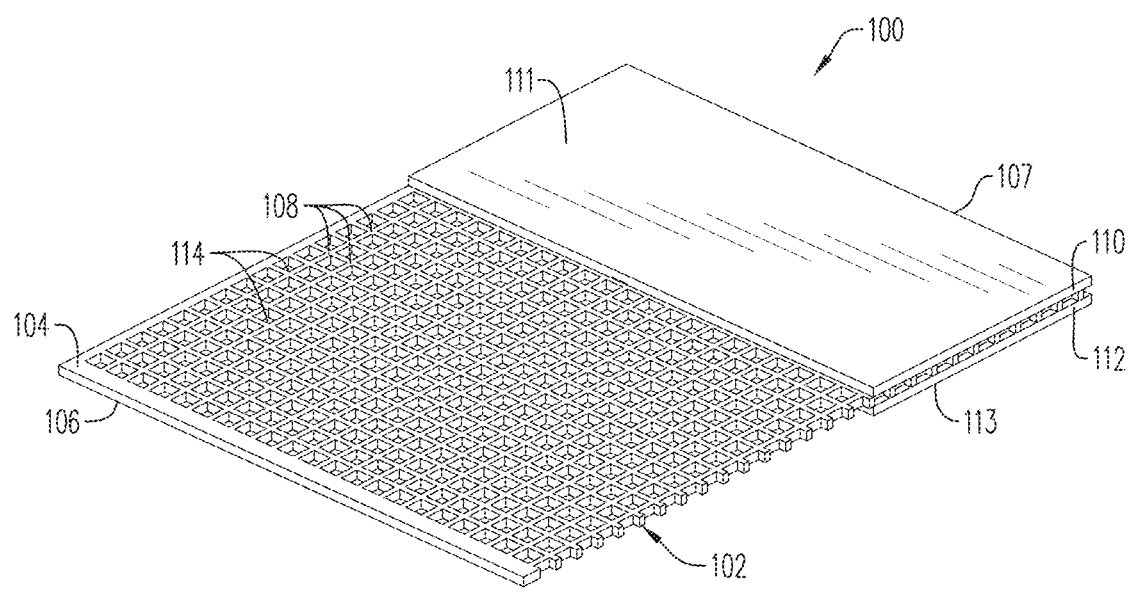
FIG. 12 is a perspective cutaway view of the gasket in accordance with the embodiment shown in FIG. 10.

FIG. 12 is an orthogonal view of a gasket 100 according to an embodiment, wherein the non-compressible core 102 is a flat gridded core that may be made of punched or extruded and flattened metal. The gridded non-compressible core 102 includes a plurality of the interconnected ribs 108 that define the array of openings, apertures, or spaces 114, which in this embodiment are square. The spaces 114 according to an embodiment of the gasket 100 are of a substantially uniform shape. In addition, the pattern of the ribs 108 and spaces 114 is predetermined to ensure that there is at least one rib 108, and in some embodiments several ribs 108, between a fluid opening in the gasket and the outside edges of the gasket. Each rib concentrates the pressure between the compressible sealing material and the adjacent mating surface to enhance the seal. Thus, with a properly designed grid pattern, there is no leakage path between the fluid opening of the flanges and the outside of the flange and a very reliable seal is formed.

As shown, the first compressible layer 110 is applied to the first surface 104 of the non-compressible core 102. The second compressible layer 112 is applied to the second surface 106 of the non-compressible core 102. The flat gridded non-compressible core 102 in this example is formed of interconnected linear ribs 108 that form a grid pattern 115 and define an array of square spaces 114. The interconnected ribs 108 of the grid 115 create an array of relatively incompressible regions that support the first compressible layer 110 or second compressible layer 112 composed of sealing material coated onto the surfaces of the non-compressible core 102. As explained in more detail below, the sealing material of the first compressible layer 110 or second compressible layer 112 is able to flow or be extruded into the spaces 114 as the gasket 100 is compressed between two mating surfaces. Advantageously, the compressible layers can flow to a greater degree at high pressure locations 118 such as around bolt holes, as will be discussed in greater detail hereinbelow.

Figure 14:
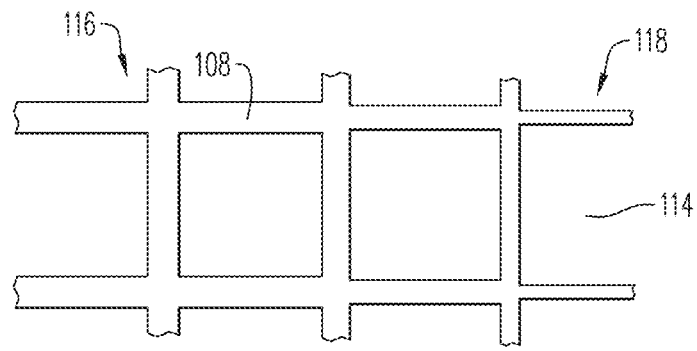
FIG. 14 is a top view of the gridded core of the gasket in accordance with an embodiment.
Figure 15:
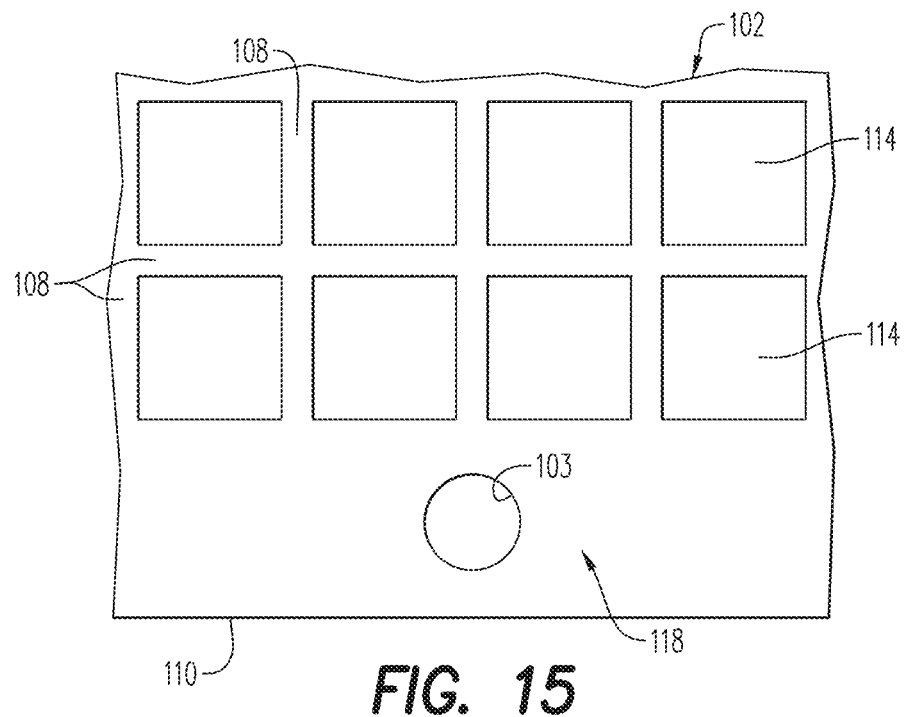
FIG. 15 is a top view of the gridded core of the gasket in accordance with an embodiment.

FIGS. 14-15 illustrate a top view of a gridded non-compressible core 102 as generally described above. In the embodiment as illustrated, the spaces 114 will allow the sealing material of at least one of the first compressible layer 110 and the second compressible layer 112 to flow into the spaces 114. This will occur to a greater degree at area 118 nearer to the first bolt hole 103, and to a lesser degree at the midpoint area 116. According to FIG. 14, it is possible to provide ribs 108 of the core 102 with varying degrees of thickness. As shown herein, the ribs 108 closest to the area 118 are thinner than are ribs 108 away from the area 118.

Figure 16A:
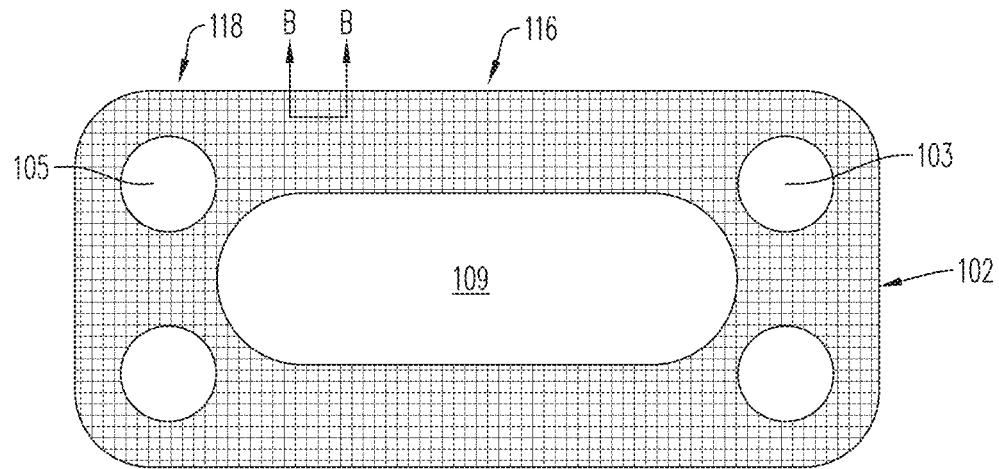
FIG. 16A is a top view of the gridded core of the gasket in accordance with an embodiment.
Figure 16B:
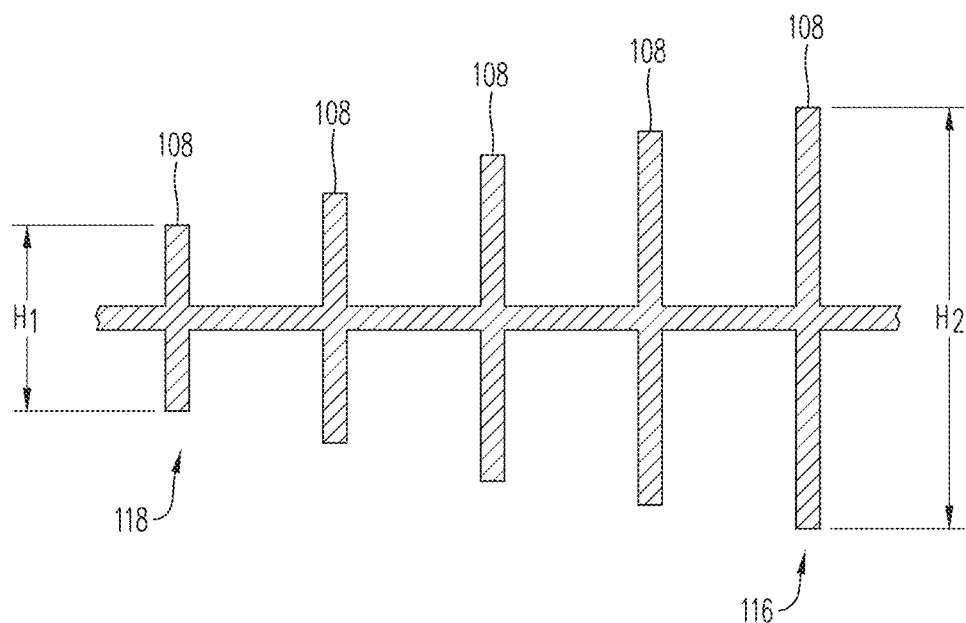
FIG. 16B is a cross-sectional side view of the gridded core of the gasket in accordance with an embodiment taken along lines B-B of FIG. 16A.

Turning to FIGS. 16A-16B, in this embodiment, the height H of the ribs 108 that define the grid 115 varies across the surface of the non-compressible core 102. For example, the height H of the ribs 108 may vary from 0.005 inches to 0.03 inches. FIG. 16A further depicts an embodiment of the gasket 100 including a flat, gridded non-compressible core 102 that may be made of punched or extruded and flattened metal, thermoset plastic, thermoset composite material, or another appropriate material such as Teflon, PVC, or renewable PLA. The gridded non-compressible core 102 includes the plurality of ribs 108 that define the array of spaces 114, which in this embodiment are square.

To provide additional detail, FIG. 16B is a cross-sectional expanded view of the ribs 108 marked by the arrow B-B in FIG. 16A. FIG. 16B illustrates the varying heights $H_1$, $H_2$ (and varying heights therebetween) of the ribs 108 across the surface of the non-compressible core 102. The ribs 108 may project to a greater height $H_2$ from the surface of the non-compressible core 102 in regions of the gasket 100 that will encounter lower compression forces and may project to a lower height $H_1$ in regions that will encounter higher compression forces. Lower compression forces will result on the gasket 100 at the midpoint 116 between a first bolt hole 103 and a second bolt hole 105, as well as points near the midpoint of the opening 109. Higher compression forces will result on the gasket 100 at locations adjacent to the first bolt hole 103 and the second bolt hole 105 (and the other bolt holes). Between locations of high compression force and low compression force, the height H of ribs 108 may increase as relative compression force decreases and the distance between mating surfaces subject to compressive force increases. Employment of a gridded non-compressible core 102 with ribs 108 of varied heights H depending on distance between flange mating surfaces and relative compressive forces facilitates the sealing capabilities of first compressible layer 110 and second compressible layer 112 having a uniform thickness across the surface of the gasket 100. Alternatively, the thickness of the first compressible layer 110 or second compressible layer 112 may be modified at different locations on the gasket 100 surface (not shown).

The degree to which the first compressible layer 110 and second compressible layer 112 of sealing material can flow into the spaces 114 of the non-compressible core 102 can be varied across the area of the gasket 100. The gasket 100 can thus be customized to provide a full surface-engaging seal at every location across mating surfaces between which it is clamped. Advantageously, as shown in FIG. 15, the compressible layers can flow to a greater degree at high pressure locations 118 such as around bolt holes. Conversely, it can flow to a lesser degree into the spaces 114 at lower pressure locations such as the mid-span area between the bolt holes. (See, for instance, FIG. 17.) Thus, the sealing material automatically conforms itself to varying distances between mating surfaces as bolts are torqued thereby improving the seal created by the gasket 100.

As shown in FIG. 15, the non-compressible core 102 can be completely eliminated or not molded in at high compression load regions, designated as 118, such as around the bolt hole 103. In such an embodiment (not shown), there may be only a first compressible layer 110 present, or a first compressible layer 110 and a second compressible layer 112 in contact with one another through at least one of the spaces 114 of the non-compressible core 102 upon compression and sealingly engaged by compressive forces exerted by the flange bolt onto the gasket 100. (See, for instance, FIG. 17.)

If the gridded non-compressible core 102 is molded from thermoset plastic or another relatively incompressible polymer, then it can be formed in a clamshell mold in traditional ways. However, thermoset plastic can be printed and so the non-compressible core 102 can be created with a 3D printer from a mere CAD drawing. This possibility leads to very rapid prototyping, testing, and reconfiguration when designing a gasket 100 for a particular purpose.

Figure 17:
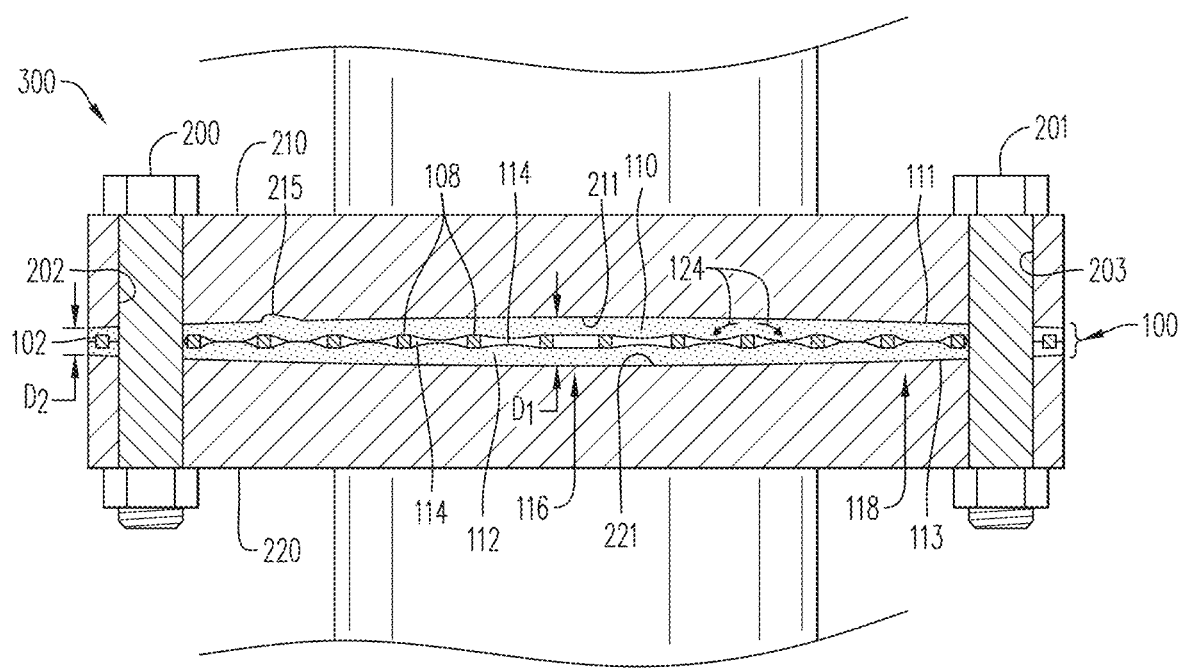
FIG. 17 is a cross-sectional view of a gasket sealed system illustrating details of the gasket in accordance with an embodiment.

FIG. 17 is a cross-sectional view showing the gasket 100 clamped between and self-conforming to varying distances between a first mating surface 211 of a first flange 210 and a second mating surface 221 of a second flange 220. It will be understood that certain dimensions and curvatures are exaggerated in FIG. 17 for clarity of explanation. The gasket 100 is shown disposed between mating surfaces 211 and 221 of flanges 210 and 220. Bolts 200 and 201 extend through bolt holes 202 and 203 in the flanges 210, 220 and in the gasket 100 and are torqued to pull the mating surfaces 211, 221 together and compress the gasket 100 between them. Since the clamping force is greater in the area 118 adjacent to the bolts 200, 201 and bolt holes 202, 203, and less in the midpoint 116 between these holes, the flange 210 will tend to deform or bow away from the adjacent flange 220 across the mating surfaces 211, 221 between bolt holes 202, 203. The mating surfaces 211, 221 are thus slightly farther apart in the midpoint 116 than in the vicinities 118 of the bolts 202, 203. This is illustrated in FIG. 17 by the relative distances between mating surface 211 an, marked by $D_1$ (the distance between mating surfaces 211 and 221 at the midpoint 116) and $D_2$ (the distance between mating surfaces 211 and 221 in the vicinity 118 of the bolts/bolt holes). Thus, the distance $D_1$ is greater than the distance $D_2$ when the bolts 201 and 202 are tightened.

As shown in FIG. 17, the flat gridded non-compressible core 102 is provided with the first compressible layer 110 on the upper surface 104 and the second compressible layer 112 on the lower surface 106 of the core 102. The first compressible layer 110 includes the planar outer surface 111 shaped and sized to sealingly engage in a surface-to-surface abutting relationship with the first mating surface 211 of the flange 210, and the second compressible layer 112 includes the planar outer surface 113 shaped and sized to sealingly engage in a surface-to-surface abutting relationship with the second mating surface 221. The first compressible layer 110 and second compressible layer 112 are formed of sealing materials which can be any material that can form a seal when clamped between mating surfaces but that has sufficient flow characteristics appropriate for the gasket environment and application to allow the material to flow or extrude at least partially into the spaces 114 when subjected to a compression load. Across the surface of the gasket 100, the first compressible layer 110 sealingly engages the first mating surface 211 and the second compressible layer 112 sealingly engages the second mating surface 221. It should be appreciated that the same engagement may occur in an embodiment having a single compressible layer coated onto one side of a non-compressible gridded non-compressible core 102 and a single mating surface. Under certain circumstances, one or both of the mating surfaces 211, 221 may have a deformation 215 resulting in a non-planar mating surface. As shown in FIG. 17, the first compressible layer 110 is able to flow into and fill the deformation 215 so that the seal between the mating surface 211 and the first compressible layer 110 is not compromised.

Referring again to FIG. 17, in the midpoint 116, the first compressible layer 110 and second compressible layer 112 engage the respective mating surfaces 211, 221 to form a seal. Either the first compressible layer 110 or the second compressible layer 112 or both the first compressible layer 110 and second compressible layer 112 may flow or extrude slightly into the spaces 114 of the gridded non-compressible core 102 as a result of the lower compression forces applied by the slightly outward-bowed mating surfaces 211, 221 in midpoint region 116. In the vicinities 118 of the bolt holes, however, the compression forces applied by the mating surfaces 211, 221 are significantly higher and the resulting distance between the mating surfaces 211, 221 is much less as compared to at midpoint region 116. Under these conditions, the first compressible layer 110 and the second compressible layer 112 are squeezed or extruded by compressible force and as a result flow into the spaces 114 to accommodate for the narrower space around the bolt holes. The flowability of the first compressible layer 110 and second compressible layer 112 is illustrated by arrows 124 in FIG. 17, showing the sealing material of the first compressible layer 110 and second compressible layer 112 flowing or extruding around the rib 108 and contacting each other between the rib 108 by partially or completely filling at least a portion of the spaces 114 surrounding the rib 108. In alternative embodiments of the gasket 100, the gridded non-compressible core 102 may be absent from locations adjacent to the first bolt hole 103 and the second bolt hole 105 on the gasket 100 to. accommodate the shorter distance and greater compressive force exerted on the first compressible layer 110 and second compressible layer 112. In some embodiments, there may be present only the first compressible layer 110, which may partially or completely fill at least a portion of the spaces 114. In another embodiment, there may be a single compressible layer adjacent to the first bolt hole 103 and the second bolt hole 105.

The elasticity and degree of stickiness of the sealing material used to form the first compressible layer 110 and second compressible layer 112, and perhaps the configuration of the grid 115 are designed so that, for a particular flange or sealing requirement, the sealing material of the compressible layers 110, 112 maintains superior and surface-wide sealing contact with the mating surfaces 211, 221, throughout the joint. It thus will be recognized that the gasket 100 in an embodiment compensates for the deformation or bowing of the first mating surface 211 or second mating surface 221 due to compression force, and thus may be said to be "self-conforming."

Figure 18A:
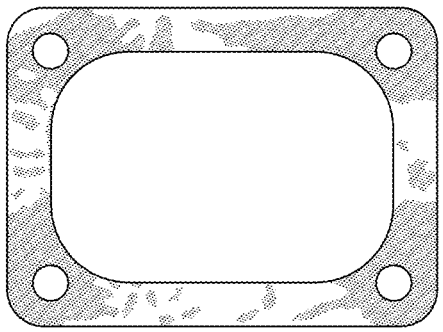
Figure 18B:
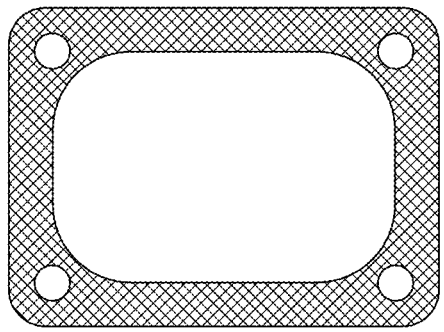

FIGS. 18A and 18B show the results of a Fujifilm pressure test illustrating the effectiveness of the inventive concept described herein. A Fujifilm test of a gasket involves placing a sheet of pressure-sensitive film between a gasket and a flange mating surface and torqueing connecting bolts to a recommended specification. The pressure-sensitive film is embedded with microspheres filled with red dye. As the compression forces on the gasket, and the film, are increased, the microspheres are ruptured as a function of the pressure at various locations between the flanges. The result is a red imprint that records the pressure applied by the flange to the gasket across the entire surface area of the flange. It is a common and standard test well-known in the gasket industry to those of ordinary skill, and results in a pressure map FIG. 18A shows a Fujifilm pressure test for a standard fiber core gasket of the prior art placed between two flanges with the bolts torqued to specification. The Fujifilm pressure map reveals that while significant pressure was generated in the regions adjacent to the bolt holes, significantly less pressure was generated in the mid-spans of the test flange between the bolt holes. In fact, this pressure map would indicate the potential for leaks in the mid-span portions of this particular joint of the prior art due to the unequal distribution of pressure throughout the gasket at its contact points with the mating surfaces.

FIG. 18B shows the results of a Fujifilm test using the same joint and the same bolt tightness with the flat gridded core gasket according to an embodiment. The sealing improvement, due to the equal distribution of compression forces across the entire surface of the gasket, can be seen clearly. The Fujifilm imprint reveals that very consistent pressures were applied by the gasket to the mating surfaces across the flange joint. In fact, the results of this test indicate that a complete seal was formed with no path available for leakage either in the vicinities of the bolt holes or in the mid-span regions of the joint.

Figure 18C:
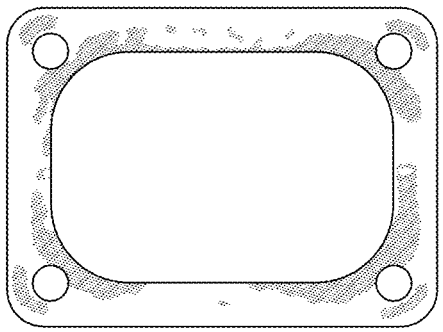
Figure 18D:
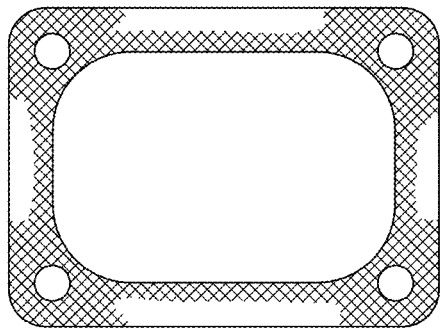

The same tests were carried out with the bolts torqued to a value less than specification. In other words, the bolts were torqued at different levels for the gaskets shown in FIGS. 18A and 18B, than the torques applied for the gaskets shown in FIGS. 18C and 18D. The results of this test are shown in FIGS. 18C and 18D. As can be seen, the Fujifilm pressure test resulting from the standard fiber core gasket of the prior art in FIG. 18C indicates that a seal was not formed under these conditions. Specifically, in the mid-spans, there was barely enough pressure generated to be registered by the Fujifilm. This joint likely would have leaked.

In FIG. 18D, however, the Fujifilm imprint for the flat gridded core gasket as described as an embodiment herein indicates that even at bolt torque significantly less than specification, the sealing engagement formed by the gasket resulted in a complete seal between the mating surfaces with no paths for leakage to occur.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A gasket for forming a seal between a first mating surface and a second mating surface, comprising:
   a non-compressible substrate with a first surface, a second surface, and a central opening;
   a first compressible layer configured to cover the entire first surface and to contact the first mating surface in a surface-to-surface abutting relationship; and
   a second compressible layer configured to cover the entire second surface and to contact the second mating surface in a surface-to-surface abutting relationship, wherein
      at least one of the first compressible layer and second compressible layer is conformed to fill at least one defect in at least one of the first mating surface and the second mating surface upon compression of the gasket;
      the non-compressible substrate is a non-compressible gridded core having ribs forming spaces therebetween;
      the ribs are of a varied height;
      at least one bolt hole defining a high-pressure location surrounding the bolt hole;
      a gasket midpoint defined by a location other than the bolt hole area; and
      the ribs are of a greater height proximate the gasket midpoint and a lesser height proximate the bolt hole.

2. The gasket of claim 1, wherein at least one of the first compressible layer and the second compressible layer is formed of at least one material selected from the group consisting of thermoset elastomers and thermoplastic elastomers.

3. The gasket of claim 1, wherein the non-compressible substrate is formed of at least one material selected from the group consisting of metals, thermoset plastic materials, and thermoset composite materials.

4. The gasket of claim 1, wherein at least one of the first compressible layer and the second compressible layer has a larger surface area than that of the non-compressible substrate.

5. The gasket of claim 1, wherein the ribs are configured in a grid arrangement.

6. The gasket of claim 1, wherein at least one of the first compressible layer and the second compressible layer at least partially fills at least some of the spaces of the non-compressible gridded core upon compression of the gasket.

7. A method of sealing a first mating surface and a second mating surface, the method comprising:
   providing a gasket having
      a non-compressible substrate with a first surface, a second surface, and a central opening,
      a first compressible layer conformed to sealingly engage with the first mating surface and configured to cover the entire first surface and to contact the first mating surface in a surface-to-surface abutting relationship, and
      a second compressible layer conformed to sealingly engage with the second mating surface and configured to cover the entire second surface and to contact the second mating surface in a surface-to-surface abutting relationship, wherein
         at least one of the first compressible layer and second compressible layer is conformed to fill at least one defect in at least one of the first mating surface and the second mating surface upon compression of the gasket;
         the non-compressible substrate is a non-compressible gridded core having ribs forming spaces therebetween;
         the ribs are of a varied height,
         at least one bolt hole defining a high-pressure location surrounding the bolt hole;
         a gasket midpoint defined by a location other than the bolt hole area; and
         the ribs are of a greater height proximate the gasket midpoint and a lesser height proximate the bolt hole;
   positioning the gasket between the first mating surface and the second mating surface;
   compressing the gasket;
   conforming at least one of the first compressible layer and the second compressible layer to distribute compression forces evenly across the surface area of the gasket; and
   uniformly sealing the first compressible layer and the first mating surface and the second compressible layer and the second mating surface.

8. The method of claim 7, further comprising:
   filling at least one defect in at least one of the first mating surface and the second mating surface with at least one of the first compressible layer and the second compressible layer.

9. The method of claim 7, further comprising:
   partially filling at least some of the spaces with at least a portion of at least one of the first compressible layer and the second compressible layer.

10. The method of claim 7, further comprising:
    contacting the first compressible layer with the second compressible layer in the spaces between the ribs of the non-compressible gridded core.

11. The method of claim 7, wherein the non-compressible substrate includes an edge coating on a surrounding edge of a central opening that extends above and below the plane of the non-compressible substrate, and further comprising:
    creating a uniformly pressurized seal between the edge coating and the first mating surface and between the edge coating and the second mating surface.

* * * * *